Dec. 1, 1964  P. E. CLARY  3,159,389

LAMINATED LEAF SPRING

Filed Aug. 20, 1963

PHILIP E. CLARY
Inventor

By *John R. Faulkner*
*Clifford L. Sadler*
Attorneys

3,159,389
LAMINATED LEAF SPRING
Philip E. Clary, Hornchurch, England, assignor to Ford Motor Company, Dearborn, Mich., a corporation of Delaware
Filed Aug. 20, 1963, Ser. No. 303,310
1 Claim. (Cl. 267—50)

The present invention relates to laminated leaf springs and more particularly, to interliners for such springs that are provided to reduce friction between the spring leaves.

A laminated leaf spring is particularly well suited for automotive and truck applications. One of their many advantages is that they can serve to position the vehicle axle, in addition to functioning as a spring element. Leaf springs, however, have certain inherent disadvantages. When a spring of this type flexes, there is an inter-reaction between the spring leaves that can adversely affect the spring rate.

A number of devices have been suggested for reducing friction and for facilitating movement between the spring leaves. One common suggestion of the prior art has been to use rubber as a liner between the spring leaves. In such an application, the rubber will flex to permit relative movement. The second major suggestion of the prior art was to use a woven cloth fabric layer saturated with a lubricant as an interliner. Neither of these solutions are entirely satisfactory as is evidenced by the continuing volume of prior art directed to the problem.

In a laminated leaf spring according to the present invention, the leaves of the spring are separated by a strip of oil impregnated porous polyethylene. Porous polyethylene has good wear and deformation resistant quality. The lubricant impregnation of the porous plastic reduces friction between the leaves and helps to eliminate spring squeaks. The lubricant impregnated porous polyethylene also acts as a damping medium for vibrations transmitted through the spring assembly.

Preferably, a band is fixed to the lower leaf of the spring assembly and surrounds the several leaves. The band is spaced from the upper leaf by a piece of lubricant impregnated porous polyethylene.

The many objects and advantages of the present invention will become amply apparent from the following description when considered in connection with the accompanying drawings in which.

Figure 1:
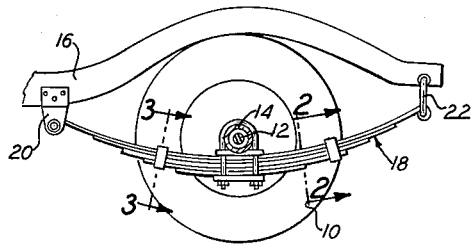
FIGURE 1 is a side elevational view of a vehicle suspension employing a laminated leaf spring constructed in accordance with this invention.

The invention is hereinafter particularly described with reference to the accompanying drawings which disclose a presently preferred embodiment. In FIGURE 1, a vehicle suspension system is illustrated having a wheel 10 drivingly connected to an axle 12. The axle 12 is rotatably supported in an axle housing 14. A frame portion 16 of a vehicle chassis is supported on the axle housing 12 by a multiple leaf spring 18. The multiple leaf spring is pivotally connected to a bracket 20 at its forward end. A spring shackle 22 connects the rear end of leaf spring 18 with the frame member 16.

Figure 2:
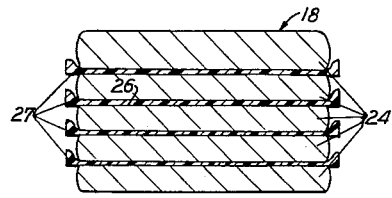
FIGURE 2 is a sectional view taken along section lines 2—2 of FIGURE 1.
Figure 3:
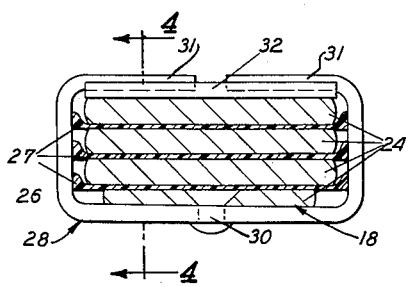
FIGURE 3 is a sectional view taken along section lines 3—3 of FIGURE 1.
Figure 4:
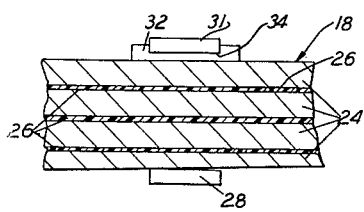
FIGURE 4 is a sectional view taken along section lines 4—4 of FIGURE 3.

Reference is now made to FIGURES 2, 3 and 4, where the construction of the leaf spring 18 of FIGURE 1 is disclosed.

The leaf spring 18 comprises a series of individual spring leaves 24. The ends of the uppermost leaf 24 are curled over to form spring eyes for attachment to the bracket 20 and the shackle 22. The spring leaves 24 are separated from each other by strips 26 of lubricant impregnated porous polyethylene. The strips 26 are each channel-shaped having enlarged edge flanges 27. The leaves 24 are located in the channels and the edge flanges 27 prevent the strips 26 from being displaced.

The leaves 24 are held together toward their ends where there are only four leaves 24 by an encircling band 28. The band 28 has a generally C-shape with its midportion affixed to the lower leaf by a rivet 30 and its ends 31 spaced from the upper leaf by a piece 32 of porous polyethylene. The piece 32 has a groove 34 in which the ends 31 of the band 28 are located. The groove 34 thus prevents the piece 32 from being displaced.

The foregoing description presents the presently preferred embodiment of this invention. Alterations and modifications may occur to those skilled in the art that will come within the scope and spirit of the following claim.

I claim:
A motor vehicle suspension system having a frame, a wheel support structure, a leaf spring interconnecting said frame and said wheel support structure, said leaf spring comprising a plurality of overlapping spring leaves, interliners interposed between said spring leaves, said interliners each comprising a strip of lubricant impregnated porous polyethylene, said strips having enlarged edges, said spring leaves being situated between said edges, a sheet metal band having a generally C-shape encircling said plurality of leaves, said band being secured to one of said leaves, the ends of said band being spaced from another of said leaves by a lubricant impregnated porous polyethylene piece, said piece having a generally channel shape so that it is retained by said band.

References Cited in the file of this patent
UNITED STATES PATENTS

| | | |
|---|---|---|
| 2,660,425 | Davis | Nov. 24, 1953 |
| 2,667,347 | Jacobs | Jan. 26, 1954 |
| 2,735,672 | Bradley | Feb. 21, 1956 |
| 2,801,100 | Crites | July 30, 1957 |
| 2,951,053 | Reuter | Aug. 30, 1960 |
| 2,999,679 | Ulderup et al. | Sept. 12, 1961 |

FOREIGN PATENTS

| | | |
|---|---|---|
| 695,195 | Great Britain | Aug. 5, 1953 |
| 1,120,904 | Germany | Dec. 24, 1961 |